May 13, 1969 D. WINROW 3,444,551
MAGNETICALLY OPERATED DISPLAY DEVICE HAVING DISPLAY
ELEMENTS IN LIQUID SUSPENSION
Filed June 3, 1966
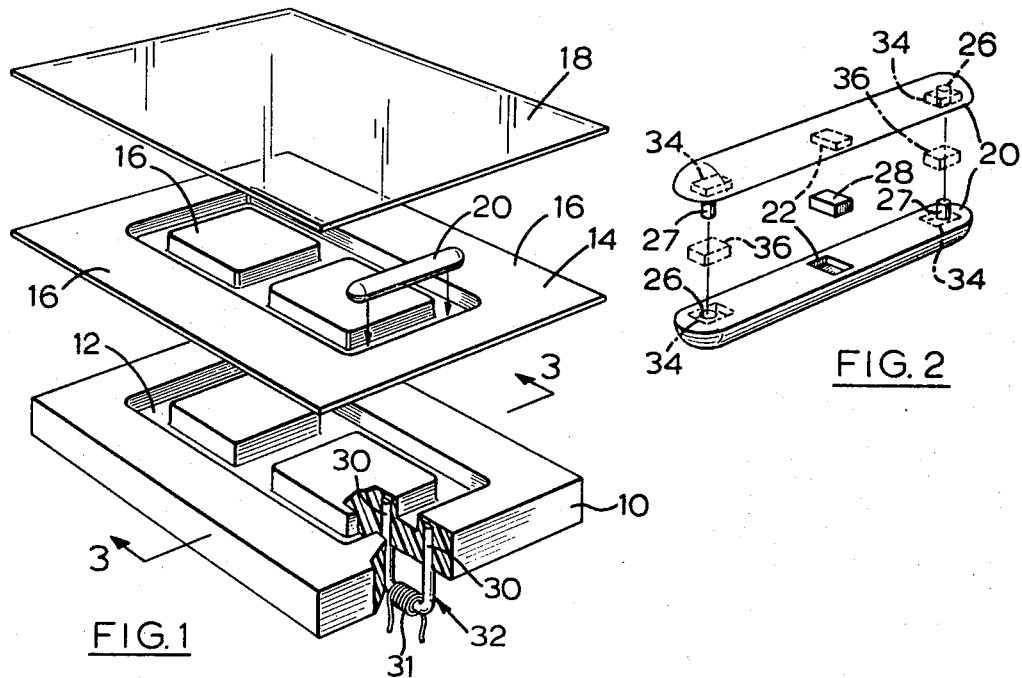
FIG.1
FIG.2
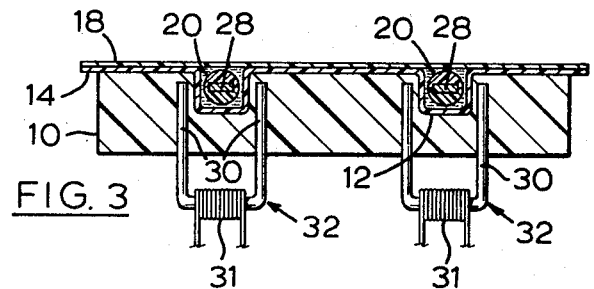
FIG.3
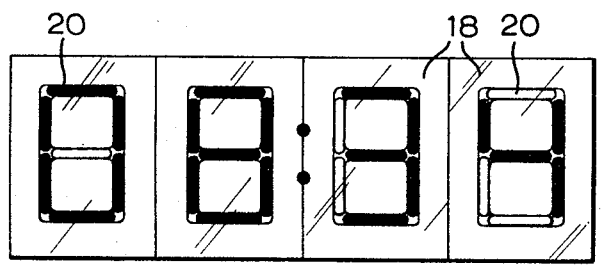
FIG.4
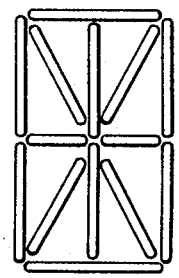
FIG.5
*INVENTOR.*
DONALD WINROW
BY *Westell & Hanley*

United States Patent Office 3,444,551
Patented May 13, 1969

3,444,551
MAGNETICALLY OPERATED DISPLAY DEVICE HAVING DISPLAY ELEMENTS IN LIQUID SUSPENSION
Donald Winrow, Downsview, Ontario, Canada, assignor, by mesne assignments, to Ferranti Packard Limited, Toronto, Ontario, Canada
Filed June 3, 1966, Ser. No. 555,053
Int. Cl. G08b 5/00; G09f 11/23, 19/00
U.S. Cl. 340—378
6 Claims

ABSTRACT OF THE DISCLOSURE

An indicating element containing a magnet is surrounded by a liquid and is free floating in a housing having a transparent viewing area. The housing allows the element to rotate about one axis when the magnet is influenced by electromagnets mounted outside said housing.

---

This invention relates to the provision of indicia or display elements or modules.

It is an object of the invention to provide a means whereby indicia or other designs may be cheaply and easily displayed.

It is an object of this invention to provide a means whereby a plurality of indicia elements are placed in a predetermined arrangement, and of contrasting appearance on two different surfaces, such surfaces being selectively displayable by rotation of said elements, means for providing for said elements an environment of a liquid of approximately the same specific gravity to reduce frictional effects, and means for magnetically selecting the orientation of said surfaces so that in the case of each element, one of said contrasting surfaces is displayed, and by the combined appearance of said selected displayed surfaces, the desired indicia or design is displayed.

By surfaces contrasting in appearance, we include, not only surfaces which contrast, when viewed by the naked eye in normal lighting, but also surfaces which do not contrast under such conditions but which contrast when due to some treatment of a surface and/or quality of the illuminating light.

FIGURE 1 is an exploded view of the device;
FIGURE 2 is an exploded view of the rotatable elements;
FIGURE 3 is a cross-section taken on the line 3—3 of FIGURE 1;
FIGURE 4 is a front view showing indicia, made by devices in accord with the invention, forming a pattern of numbers; and
FIGURE 5 is a diagram showing the invention used for forming letters.

In the drawings, is shown, a module in accord with the invention for displaying a selected numeral and for such use the module comprises a base 10 preferably of molded plastic having grooves therein, shaped to the general form of a rectangular figure 8. A liquid impervious sheet 14 preferably also made of plastic is shaped to provide grooves which nest in the rectangular grooves 12, and is attached thereto by any desired manner such as gluing, bonding or the like. The sheet 14 is provided with flat areas 16 around such nesting areas for bonding to a flat transparent sheet 18 which overlies areas 16 and the nesting grooves sheet 18 being made of transparent material and preferably of plastic, which therefore provides chambers corresponding to the figure 8 shaped rectangular groove; and which transparent sheet 18 defines in directions roughly perpendicular to its surface, the direction for viewing elements in said nesting grooves.

An indicating element 20 is provided of cross-section dimensions to be loosely received in such groove and it will be noted that such indicating element is generally of longitudinal shape defining thereby a longitudinal axis (which will be the rotational axis of the element) and preferably of cylindrical cross-section. It is within the scope of the invention although it would be of uncommon application to provide an element of other than cylindrical cross-section. However, if this were done, the dimensions of the element and the nesting grooves must be dimensioned so that rotation of the former, with respect to the lateer can occur through the design range of rotation of the rotatable element which will usually be the full 360°. The lengths of individual elements 20 are designed so that three of such elements rest loosely in the three horizontal grooves in the figure 8 whereas, in each vertical groove, two of such elements are provided, one extending between the upper cross-bar of the 8 and the middle cross-bar and the other between the middle bar and the lower cross-bar.

The elements 20 are contrastingly coloured on angularly displaced sides relative to the axis of rotation and preferably on opposite sides so that a 180° rotation about the rotational axis of the element will reverse the colour, and are provided with a magnetic field forming element, producing a magnetic field at an angle to and preferably perpendicular to the longitudinal axis.

In the preferred form of the invention, the display elements 20 are made up of two semi-cylindrical members, one of a white and the other of a black colour, each comprising a half-cylinder, the line of division being along the longitudinal axis, and containing facing recesses 22 in the central portions to receive a bar magnet 28. The elements are provided with means for attachment by gluing or otherwise which may include the complementary pegs 27 and wells 26 shown in the diametrical surfaces of the semi-cylindrical members. The element 20 is dimensioned in relation to the cross-sectional dimensions of the groove 12 to move loosely about therein, limited in such movement only by the groove dimensions, which, it will be noted, only allow very limited translation and subject to a slight ability in the element to wobble, limit rotation of the element to rotation about its longitudinal axis.

The bar magnet 28 may be considered as a schematic representation of means for providing a magnetic axis at an angle to and preferably perpendicular to the rotational axis of the rotatable element 20 since many magnet materials are available today which will provide the desired direction of field but which will not approach the conventional shape of the bar magnet.

To provide for rotation of the element 20, the chamber between the nesting grooves, and the sheet 18 is filled with a liquid of substantially the same specific gravity as the element 20. This provides a liquid environment for the element, wherein up to the accuracy of balancing of the specific gravity of element 20 (taking into account of course, the magnet 28) against the specific gravity of the solution, the element will ideally be suspended and tend neither to float nor to sink in the liquid.

Many liquids are available to achieve this, the major criterion being that: they can be brought to the same specific gravity as the elements but they shall not be of a type which reacts with the material of the housing and the elements and that the handling and maintenance qualities of the liquid shall be satisfactory.

In the preferred embodiment the specific gravity of the plastic elements 20, taking into account the weight of magnet 28 is about 1.6–1.7. The liquids which may be used with this are preferably Freon which is available in specific gravity ranges from about .8 to 2.00; silicone oil available in a range including 1.6 to 1.7 (although tending because of its diffusing qualities to spread in handling and render sealing of the liquid chamber difficult), and salt solution which may, in some situations be subject to crystallization, and in others to freezing conditions. Any other liquids and rotatable elements may of course be used, which are suitable to the conditions in question.

Other means than those shown may be used to loosely confine the elements and to retain about them the desired liquid environment. With two contrasting surfaces on the elements, it will be seen that to achieve the purpose of the inventor, rotation of the elements may be allowed about any axis except that which extends in the viewing direction since the last defined axis will not allow the selective display of the contrasting surface. Hence any mode of housing which limits the permissible axes of rotation in this way will be satisfactory.

It may also be noted that the chambers for a number of rotatable elements (here the number to form a numeral or letter) are all contained in the same chamber or housing with a common liquid environment. However it will be realized that it is within the scope of the invention to provide separate chambers or housings for each rotatable element.

Means are provided, exterior to the rotatable element, for providing that one of two magnetic fields of different direction or polarity may affect the magnet in the rotatable element to control the orientation of the magnet and rotatable element. The direction and polarity of the two magnetic fields, are chosen, relative to the arrangement of the two contrasting surfaces on said element so that the selection of one or the other field causes the display of one or the other contrasting surface in the desired viewing direction. By the term "different direction or polarity" I, of course, means to include the arrangement where the two fields are merely in the same direction and opposite sense. This will be the most common means and, as will be seen, is achieved in the specific embodiment, by providing that the field is formed by two magnetic poles whose polarities are reversible to reverse the field, and this will usually but not necessarily involve placing the contrasting surfaces on opposed surfaces of the rotatable element.

Means are provided in the specific embodiment in relation to the bar magnet 28 in each rotatable element, of providing a magnetic field exterior to the rotatable element 20 to react with the magnet 28 in the rotatable element 20 and produce the desire orientation of the rotatable element 20. In the preferred embodiment, pole forming members are embedded in the base 10 in such a way, that a pair of magnetic pole forming members 30 are located on each side of the groove extent, substantially opposite the location of each magnetic element 28. Energizing means for providing a field between the two pole forming members 30 is provided in one of a number of well known ways. Two pole forming members 30 form part of a composite U-shaped member with an energizing winding 31 about a base of the U. The pole pieces 32 including pole forming members 30 of suitable magnetic material. The magnetizing windings are arranged to be selectively energized by means not shown to produce, as desired in each element 20, a black or a white surface in the display direction, which is through the transparent cover sheet 18. By the proper selection of such black and white sides for display it will be noted that with the rectangular figure 8 and the seven elements making it up, that any numeral from 0 to 9 may be simulated, see for example the 3 depicted in FIGURE 4.

In the specific embodiment a pair of pole forming members 30 are shown for affecting the magnet 28. It has been previously explained that the field may be formed in any manner desired and, hence it will be realized that, if desired, the two pole forming members 30 may be replaced with a single such member. The result would be a simpler construction, but somewhat less torque on the rotatable element. If a single pole forming member 30 is used, then it may be located where one of such members is now located, with the magnet 28 located as shown; or the single pole forming member 30 might be located below the rotatable element with the magnet 28 rotated 90° relative to the positions of the contrasting surfaces.

From FIGURE 5 it will also be noted, that by the use of 14 elements arranged as shown in the drawings, but otherwise encased in the manner shown in the preferred embodiment any letter may be simulated.

Thus in accord with the invention discussed, any number of such modules may be combined to the number desired, to produce, under the control of the indicia forming elements an intelligent indication.

Thus, as shown in the drawings, the figure 8 array of elements may, as shown in FIGURE 4, by the magnetic selection of black and white elements be made to show the time 08:34.

The elements are made easily rotatable by filling the space surrounding them in the chamber defined by the recessed sheet element and the transparent element with liquid of substantially the same specific gravity so that the element tends neither to float nor sink but to remain substantially aggravationally suspended therein. It will be realized that any deviation from this, so that the element slightly floats or slightly sinks, will not render the device inoperable but merely increases the frictional resistance to rotation of the magnetic element.

If desired, the frictional contact of the elements with each other may be reduced by providing for magnetic repulsion between adjacent ends of different elements. Thus, as illustrated in dotted formed in FIGURE 2, each element may be provided at each end with recesses and magnetic elements, to provide small magnetic fields at each end of the device with their axes along the rotational axis of the element in which they are located; and, in a module, with the same polarity facing outwardly, on all ends, and in other applications with the same polarity at the ends of adjacent elements. It will thus be seen that any pair of adjacent ends of elements (whether of aligned or perpendicular elements) in arrangements such as those shown in FIGURES 4 and 5, will repel—and hence frictional rubbing of one element on another will be avoided. It will be realized that with the newer magnetic materials, a single strip of material may be inserted, running the length of the element, but independently magnetized, centrally to provide a field transverse to the element and at each end to provide fields, polarized as set out above extending axially. However this arrangement is the functional equivalent of the attachment means and is treated as such in the disclosure and claims.

It should also be noted that, although not shown, where the end magnetic elements are used, the attachment pegs and wells 26 and 27 (if used) may be moved to avoid co-intereference.

I claim:
1. An indicating device comprising:
   a plurality of indicator elements;
   means for providing a;
   housing means for loosely receiving said elements, said housing defining a viewing direction;
   said housing means allowing each of said elements to pivot about one axis without pivot structure and for preventing substantial movement of each of said elements in said housing from a predetermined location and from rotation about other axes;
   a magnetic pole forming member in each of said elements defining a polar axis at an angle to said one rotation axis;
   means exterior to said element for providing, selectively, one of two different magnetic fields encompassing the locus of the magnetic pole forming member in the permissible orientations of said rotatable member,
   whereby by selection of alternate ones of said magnetic fields, respective alternative orientations, of each of said elements may be achieved;
   means for providing, for viewing in said viewing direc- tion, surfaces of contrasting appearance on said elements in said alternative orientations; and means providing a liquid environment in said predetermined locations where the liquid is of approximately the same specific gravity as the average for said elements.

2. An indicating device comprising:

a plurality of indicator elements;

housing means for loosely confining and enclosing said elements and allowing limited translational movement of each of said elements from a pre-determined location;

said housing means and the shape of said elements allowing pivoting thereof about an axis without pivot structure;

means for providing a liquid environment for said elements;

a transparent area on said housing, where through said element may be viewed, thereby defining a viewing direction;

surfaces of contrasting appearance on said elements, arranged so that in two different orientations about said rotational axis, contrasting surfaces are displayed in said viewing direction;

liquid in said housing at said predetermined locations of a specific gravity approaching the average value for said elements;

a magnetic element in each of said pole pieces providing a polar axis at an angle to said rotational axis;

means for providing two alternative and differing magnetic fields in the vicinity of each of said elements arranged so that said alternative fields causes alternative display of said contrasting surfaces in said viewing direction.

3. Means for providing a selectively variable display comprising:

a plurality of elements;

means for loosely locating each of said elements in a housing limiting translation but allowing pivoting without pivot structure; and means providing a liquid environment for said elements where said liquid is of approximately the same specific gravity as the average value for said elements;

magnetic means selectively energizable for angularly orienting said elements in one of two alternative orientations about said axis of rotation;

two surfaces of contrasting appearance on each of said elements selectively displayable in said alternative orientations;

means defining a display direction, said direction and said selective orientation means being so designed that varying designs may be viewed in said display direction due to respective selection of said alternative orientations for the respective elements.

4. An indicating device comprising:

a plurality of indicator elements;

means for providing a housing for loosely receiving said elements, said housing defining a viewing direction; said housing means allowing each of said elements to pivot about one axis without pivot structure and for preventing substantial movement of each of said elements in said housing from a predetermined location and from rotation about other axes;

a magnetic pole forming member in each of said elements defining a polar axis at an angle to said one rotation axis;

a pair of magnetic pole forming members, corresponding to each of said elements and located, when energized to assume reversible opposite polarities and exert a rotational torque on said element;

whereby with alternative opposed energization of said pole forming members, two alternative orientations of each of said elements may be obtained;

means for providing, for viewing in said viewing direction, surfaces of contrasting appearance on said elements in said alternative orientations; and means providing a liquid environment in said predetermined locations where the liquid is of approximately the same specific gravity as said elements.

5. An indicating device comprising:

a plurality of indicia forming elements placed in a predetermined arrangement;

contrasting surfaces on said elements, arranged to be displayable in a predetermined viewing direction in alternative orientations of said element;

means loosely confining the movements of said elements allows rotation thereof only about axes other than an axis extending in said viewing direction whereby said surfaces are selectively displayable by rotation of said elements;

means for providing for said elements an environment of a liquid having approximately the same specific gravity as the average specific gravity of said elements; and means for selectively magnetically selecting the orientation of said elements whereby for each element the selective display in said viewing direction of one or the other of said contrasting surfaces may be achieved.

6. Means as claimed in claim 1, wherein said rotatable elements are at each end provided with magnetic field forming members, such field forming members being polarized so that the adjacent ends of adjacent rotatable members repel one another.

References Cited

UNITED STATES PATENTS

| 2,996,705 | 8/1961 | Doty | 340—373 |
| 3,036,300 | 5/1962 | Knight | 340—378 X |
| 3,074,060 | 1/1963 | Kadlec | 340—373 |

JOHN W. CALDWELL, *Primary Examiner.*

HAROLD J. PITTS, *Assistant Examiner.*

U.S. Cl. X.R.

340—336, 373